United States Patent [19]

Sobodos et al.

[11] Patent Number: 4,838,592
[45] Date of Patent: Jun. 13, 1989

[54] IMPACT-ABSORBING AMUSEMENT VEHICLE

[75] Inventors: David W. Sobodos, Hermosa Beach; David W. Chalmers, San Pedro, both of Calif.

[73] Assignee: Agajanian Enterprises, Inc., Gardena, Calif.

[21] Appl. No.: 38,655

[22] Filed: Apr. 15, 1987

[51] Int. Cl.$^4$ .................................. B60R 19/22
[52] U.S. Cl. ..................... 293/109; 293/102; 293/127
[58] Field of Search ............. 293/102, 109, 117, 120, 293/127; 180/145; 280/777; 114/219

[56] References Cited

U.S. PATENT DOCUMENTS

| | | |
|---|---|---|
| 1,380,759 | 6/1921 | Whitaker . |
| 1,534,978 | 4/1925 | De Waltoff et al. . |
| 1,754,112 | 4/1930 | Lusse .................... 293/120 |
| 2,089,500 | 8/1937 | Ochadloski ............ 293/55 |
| 2,639,626 | 5/1953 | Snyder .................. 74/493 |
| 2,916,324 | 12/1959 | Graham ................ 293/127 |
| 3,056,627 | 10/1962 | Graham ................ 296/28 |
| 3,068,039 | 12/1962 | Barenyi ................ 296/28 |
| 3,098,675 | 7/1963 | Gerin ................... 296/28 |
| 3,110,193 | 11/1963 | Bratz .................... 74/501 |
| 3,118,321 | 1/1964 | Rinke .................... 74/496 |
| 3,219,384 | 11/1965 | Graham ................ 296/28 |
| 3,284,100 | 11/1966 | Goff ...................... 280/481 |
| 3,389,617 | 6/1968 | Pavlecka .............. 74/492 |
| 3,435,700 | 4/1969 | Calhoun ............... 74/493 |
| 3,460,400 | 8/1969 | Kubokawa ............ 74/492 |
| 3,461,740 | 8/1969 | Tajima et al. ........ 74/492 |
| 3,493,257 | 2/1970 | Fitzgerald et al. ... 293/71 |
| 3,520,209 | 7/1970 | Cescone ................ 74/493 |
| 3,549,345 | 4/1951 | Tamboli ............... 74/493 |
| 3,560,041 | 2/1971 | Foster .................. 296/1 |
| 3,580,101 | 5/1971 | Jorgensen et al. ... 74/493 |
| 3,618,693 | 11/1971 | Graham ................ 180/93 |
| 3,820,790 | 6/1974 | Peterson .............. 273/129 |
| 3,836,192 | 9/1974 | Wilfert ................. 296/28 R |
| 3,853,349 | 12/1974 | Moore .................. 296/28 R |
| 3,926,462 | 12/1975 | Burns et al. ......... 293/63 |
| 3,926,463 | 12/1975 | Landwehr et al. ... 293/63 |
| 3,934,896 | 1/1976 | Barenyi ................ 280/87 R |
| 4,108,460 | 8/1978 | Silva .................... 280/236 |
| 4,324,301 | 4/1982 | Eyerly .................. 180/2 R |
| 4,365,825 | 12/1982 | Merkle ................. 280/777 |
| 4,449,420 | 5/1984 | Baba ..................... 74/501 R |
| 4,495,881 | 1/1985 | Teraura ................ 180/145 X |
| 4,513,680 | 4/1985 | Teraura ................ 114/159 |
| 4,531,291 | 7/1985 | Teraura et al. ...... 440/53 |
| 4,540,189 | 9/1985 | Tanaka ................. 280/270 |
| 4,618,160 | 10/1986 | McElfresh ............ 280/281 LP |

OTHER PUBLICATIONS

Ascot; Trak Master: A Blueprint for Slick Trak and Concession Kart Success; 1984.
Ascot; Parts Manual.
Gas Spring Company; Promotional Literature and Specifications.
Morse Controls: Morse Red Jacket Push-Pull Cables and Control Systems.

Primary Examiner—James B. Marbert
Assistant Examiner—Russell D. Stormer
Attorney, Agent, or Firm—Lyon & Lyon

[57] ABSTRACT

An amusement vehicle incorporating impact-absorbing features. An amusement vehicle with sophisticated impact-absorbing features is disclosed. Included among these features are a resilient bumper designed to absorb impact shocks without damage to the vehicle, a restorable, collapsible steering column assembly and a push-pull cable steering system.

13 Claims, 4 Drawing Sheets

IMPACT-ABSORBING AMUSEMENT VEHICLE

FIELD OF INVENTION

This invention relates to amusement vehicles intended to be steered independently by their occupants and to withstand impacts with other vehicles and solid objects such as walls. The vehicle incorporates features which prevent damage to the vehicle itself as well as features which protect the occupant from injury due to such impacts.

BACKGROUND OF THE INVENTION

Vehicles for providing amusement to occupants by being subject to collisions with other vehicles and barriers such as walls have been in existence for many years. Such vehicles have typically been steered by their occupants and have been electrically powered Alternative means of self-propulsion such as gasoline engines have also been employed. They have ridden on tracks or other surfaces. Protective, shock-absorbing features have been provided, but to a relatively low degree of sophistication. Features such as pneumatic bumpers and rubber bumpers have been used.

The present invention is an improvement over prior amusement vehicles because it incorporates features not found in prior amusement vehicles. These features include a resilient wrap-around bumper of unique configuration designed to absorb impact shocks, but to be restored to its undeformed shape once the deforming force is removed. Also included is an impact-absorbing steering column assembly, designed to collapse when an impact force is applied, but be restored once the impact force is removed. Attached to the steering column assembly is a push-pull cable used to steer the wheels of the amusement vehicle.

SUMMARY OF THE INVENTION

An amusement vehicle incorporating a body with a wrap-around resilient bumper, an impact-absorbing steering column assembly and a push-pull cable steering mechanism is provided.

The vehicle body is a plastic body shell molded to fit over, rest upon, and attach to a vehicle frame. The frame is in the form of a rectangular hoop, with the space inside the hoop being referred to as the inboard portion and the space outside of the hoop being referred to as outboard. A wrap-around bumper, filled with polyurethane foam is provided. This bumper, which in a preferred embodiment is integrated into the vehicle body, is shaped in such a fashion that, upon impact with another vehicle or with a wall, the bumper deforms resiliently under compression. A gap provided between the wrap-around bumper and the portion of the body inboard of the vehicle frame, provides a space into which the bumper can be compressed. Thus, upon impact, the bumper is compressed into the space between the wrap-around bumper and the inboard portion of the vehicle body. In addition, the configuration of the bumper relative to the vehicle frame permits the bumper to rotate about the frame as it is compressed into the gap between the bumper and the portion of the body inboard of the frame. When the deforming force is removed, the bumper assumes its original shape.

The molded portion of the vehicle body inboard of the frame forms the vehicle cockpit. As molded, there is a base, two sides, a front and a back, which form the cockpit. The cockpit is unitary in a preferred embodiment, but could be formed by individual pieces, with the two sides, front and back each being attached at their bottom edges to the base, the two side edges of the front piece being attached to the forward side edges of the side pieces, and the two side edges at the rear piece being attached to the rear side edges of the side pieces. While in a preferred embodiment the resilient bumper is an integral part of the unitary vehicle body, it could be a separate piece attached to the inboard portion of the vehicle body along the circumferential edge of the inboard portion of the vehicle body.

The amusement vehicle includes an impact-absorbing steering column assembly which is pivotally mounted to the vehicle frame by two essentially vertical connecting members called steering mast supports. In a preferred embodiment, the two steering mast supports are each attached at one end to a pivot joint on the vehicle frame. The other end of each mast support is attached to the steering column at another pivot joint. The steering column, vehicle frame and two mast supports thus form a deformable trapezoid. A shock-absorbing member, such as a gas spring or other damper, is mounted to a pivot joint diagonally between the upper end of one mast support and a pivot joint on the vehicle frame. This gas spring holds the steering column assembly in place during normal, undeformed operation. Upon impact, the gas spring is compressed and the steering column is moved about the pivot joints in an essentially forward direction away from the driver. During such motion, the steering mast supports rotate about their pivot joints and the trapezoid is deformed. Upon release of the compressive deforming force, the gas spring acts to restore the steering column and steering mast supports to their original configuration.

The steering column includes a hollow tube called the steering mast, with the steering shaft rotatably mounted within the steering mast. Attached to the end of the steering shaft opposite the steering wheel is a steering arm. Attached to the outside of the steering mast is a steering mast cable mounting bracket. A push-pull cable with a flexible outer tubular jacket and a flexible inner cable is attached to the steering column. The inner cable is attached to the steering arm. The outer jacket is attached to the steering mast by the steering mast cable mounting bracket and clamp. The other end of the cable is attached to the tie rod. The outer jacket is attached at the other end to the vehicle frame by means of a frame cable mounting bracket and clamp. This arrangement permits the turning of the steering wheel to cause the steering shaft to move the steering arm which results in a piston-like reciprocating movement of the internal cable within the outer jacket. The piston-like movement in turn moves the tie rod, thus directing the steered wheels either left, right or straight ahead. Because the pushpull cable is flexible, when the steering column assembly is deformed, the amusement vehicle can still be steered.

DETAILED DESCRIPTION OF THE INVENTION

Figure 1:
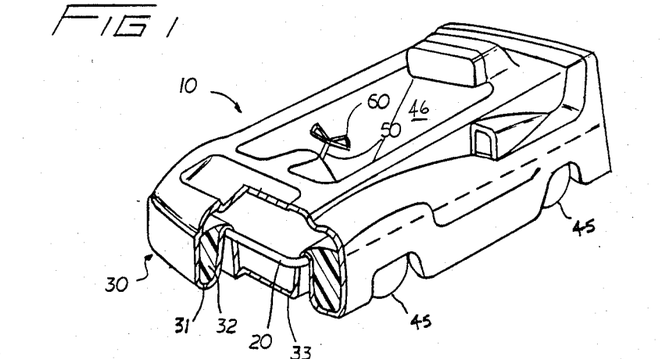
FIG. 1 is a perspective view of the vehicle body mounted on the vehicle frame, showing a cut-away of the bumper and exposing a portion of the frame.

A preferred embodiment of the amusement vehicle incorporating shock-absorbing bumper and steering column features is shown in perspective in FIG. 1. In a preferred embodiment, a vehicle body 10 with an integral wrap-around bumper 30 is shown positioned on a vehicle frame 20. In such preferred embodiment, the outer-most portion of the frame 20 is an essentially rectangular-shaped hoop. A steering column assembly 50 and steering wheel 60 are included in the vehicle. As the sectioned portion of FIG. 1 shows, the wrap-around bumper 30 is located on the outside of the vehicle frame, the outboard portion of the vehicle body, and there is a substantial portion of the overall vehicle body on the inside of the frame, the inboard portion of the vehicle body. The vehicle body 10 is provided with wheel wells and other formed indentations and cavities to permit it to fit over the frame 20, the vehicle wheels 45, and other structural and mechanical components.

A major portion of the inboard portion of the vehicle body is the vehicle cockpit 46. It is formed by a base, two sides, a front and a back. In a preferred embodiment, the cockpit 46 is unitary, but it is contemplated that it could be formed of individual pieces, as could the entire vehicle body. The cockpit 46 is formed by the two sides, front and back each being attached at their bottom edges to the base, the two side edges of the front piece being attached to the forward side edges of the side pieces, and the two side edges of the rear piece being attached to the rear side edges of the side pieces. While in a preferred embodiment the resilient bumper 30 is an integral part of the unitary vehicle body 10, it could be a separate piece attached to the inboard portion of the vehicle body 10 along the circumferential edge of the inboard portion of the vehicle body 10.

Figure 2:
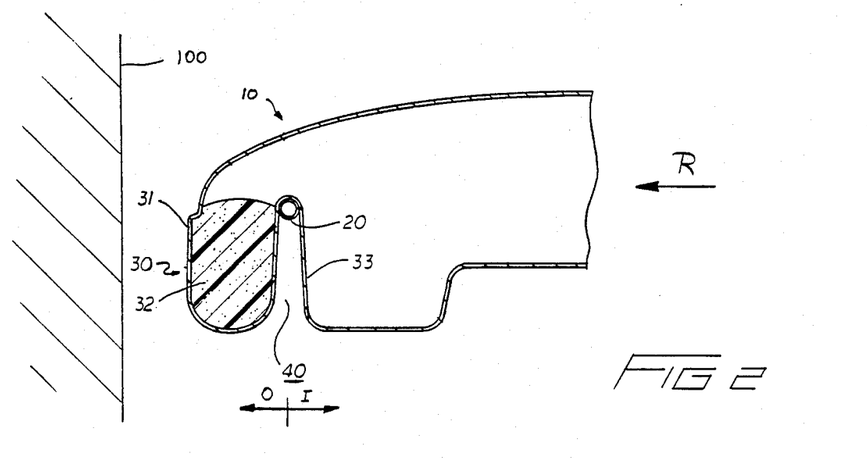
FIG. 2 is a cross-sectional view of the front of the integral bumper and vehicle body as it is supported on the vehicle frame, in an undeformed state.

A more detailed picture of the configuration of a bumper 30 is shown in FIG. 2. The vehicle body 10 is comprised of a body shell 31, molded to be fitted around frame 20. Bumper 30 is located outboard of frame member 20, while the underside and bottom of the vehicle body 33 is located inboard of the frame member 20. The inboard portion relative to frame 20 is shown by arrow I and the outboard portion is shown by arrow 0. A gap 40 is formed between the bumper 30 and the inboard portion of the vehicle body 33. The bumper is comprised of a resilient material 32 inside of the body shell 31. In a preferred embodiment, the body shell 10 is plastic, such as, but not limited to, CL100 cross link rotational molded plastic, manufactured by Phillips Petroleum, including the portion 31 forming the integral bumper 30. The filling material in space 32 of the bumper 30 is polyurethane foam in a preferred embodiment. The vehicle body 10 is shown moving in the direction shown by arrow R toward wall 100.

Figure 3:
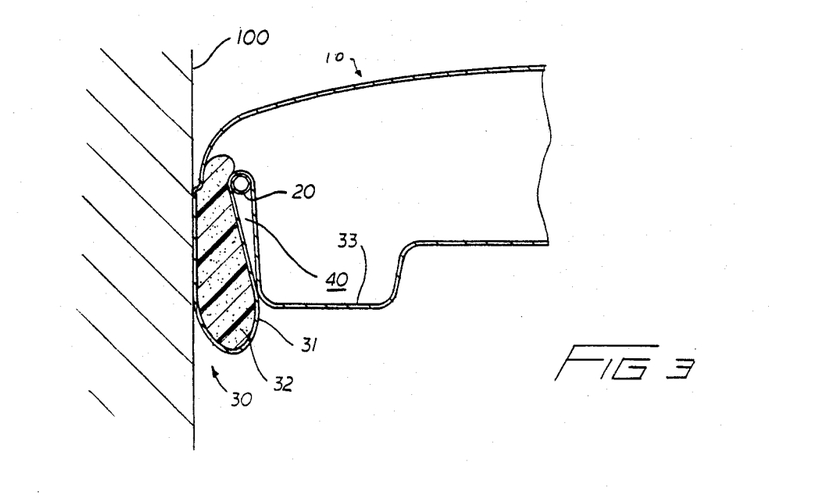
FIG. 3 is a cross-sectional view showing the front of the integral bumper and vehicle body with the bumper in its deformed, impact-absorbing state.

FIG. 3 shows a bumper system in operation. The bumper 30 has come in contact with wall 100. The resilient bumper filling 32 is compressed, allowing bumper 30 to be compressed into the gap 40. Bumper 30 is also moved rotationally about frame 20 until the inside portion of the body 33 is contacted.

Upon movement of the vehicle away from wall 100, thereby relieving the deforming force, the bumper 30 and vehicle body 10 are restored to the undeformed configuration of FIG. 2.

Figure 4:
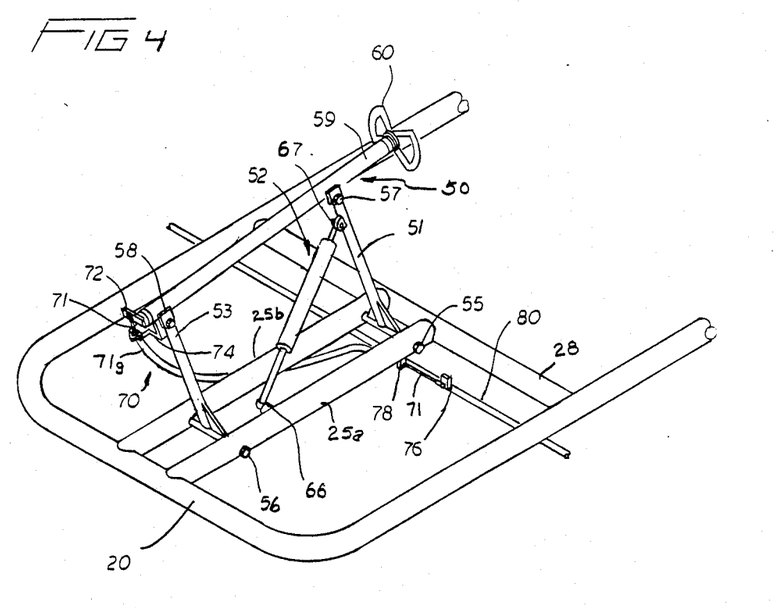
FIG. 4 is a perspective view of the flexible steering cable and the steering column assembly in its undeformed state.

FIG. 4 shows a shock-absorbing steering column assembly, generally designated by numeral 50, which is a feature of the shock-absorbing amusement vehicle invention. The shock-absorbing steering column assembly 50 is shown in its undeformed state. In a preferred embodiment, a steering mast 59, with a steering shaft 59b inside of steering mast 59 (shown in FIG. 8) and attached to a steering wheel 60, are held in place by two essentially vertical steering mast supports 51 and 53. The steering mast supports 51 and 53 are attached to steering mast 59 at pivot joints 57 and 58, respectively. Similarly, steering mast supports 51 and 53 are attached to frame 20 along two frame rails 25a and 25b at pivot joints 55 and 56, respectively. Connected diagonally between pivot joint 67 on steering mast support 51 and pivot joint 66 on frame rail 25a is a shock-absorbing damper element generally designated 52. In a preferred embodiment, the shock-absorbing damper element 52 is a gas spring. An example of such a gas spring is the kind manufactured by the Gas Spring Company, Colmar, PA. The use of gas springs manufactured by other companies is contemplated. Also, dampers other than gas springs are contemplated. Attached to the front end of the steering column assembly 50 is a steering arm 72. Steering arm 72 is attached to the end of a steering shaft 59b (shown in FIG. 8) which resides rotatably within steering mast 59. Attached to the front end of the steering mat 59 is a steering mast cable mounting bracket 74. A push-pull cable shown generally as 70 is attached to the steering column assembly 50. The push-pull cable 70 has a rigid rod and internal cable combination 71 and other components (shown in FIG. 8) which are subject to reciprocating movement within the cable jacket 71g. The rod and interior cable combination 71 is attached to the steering arm 72. The jacket 71g of the push-pull cable 70 is attached to the steering mast cable mounting bracket 74. The other end of the push-pull cable 70 jacket 71g is attached to frame rail 25a at frame cable mounting bracket 78. The other end of rod and internal cable combination 71 is attached to tie rod 0 at tie rod mounting post 76. With the exception of the gas spring 52 and the push-pull cable 70, all of the elements associated with the steering column assembly 50 are essentially rigid.

In operation, the vehicle is steered by turning steering wheel 60, which turns steering shaft 59b and the attached steering arm 72. This action reciprocates the upper end of the rod and internal cable combination 71 attached to steering arm 72. The end of rod and internal cable combination 71 attached to the tie rod 80 moves the tie rod 80 back and forth as the internal cable moves within the jacket 71g. Tie rod 80 is attached to the remainder of the steering system and moves the wheels in the desired direction.

Figures 5, 6:
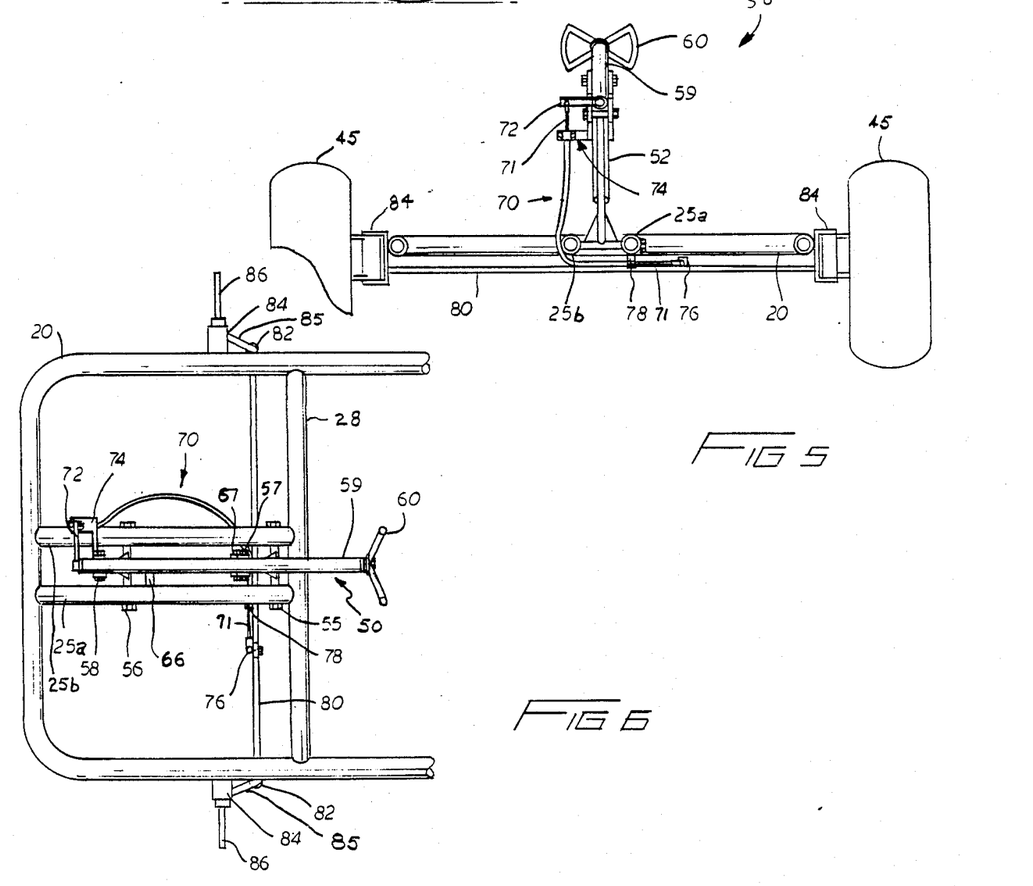
FIG. 5 is a front view of the flexible steering cable and the steering column assembly in its undeformed state.
FIG. 6 is a top view of the flexible steering cable and the steering column assembly in its undeformed state.

FIG. 5 shows a front view of the impact-absorbing steering column assembly 50 with the attached flexible steering cable 70. FIG. 6 shows a top view of the impact-absorbing steering column assembly 50 with the attached flexible steering cable 70. These views complement the perspective view of FIG. 4. Additional portions of the steering mechanism are shown in FIG. 6. The spindle 86 and hub 84 are connected to the tie rod 80 by means of ball joint 82 and spindle arm 85.

Figure 7:
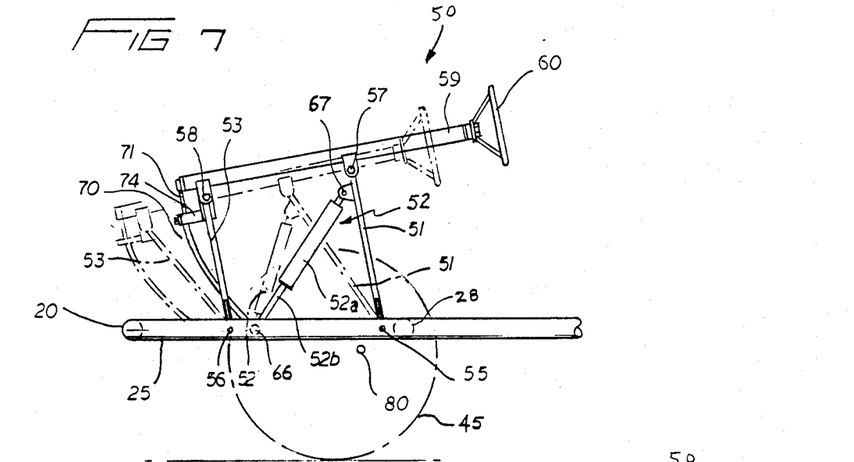
FIG. 7 is a side view of the impact-absorbing steering column assembly in its undeformed state shown in solid lines and its deformed state shown in phantom.

FIG. 7 illustrates the operation of the impact-absorbing steering column assembly 50 under impact conditions. The assembly 50 is shown in solid lines in its undeformed state. The assembly 50 is shown in phantom in its deformed, impact-absorbing state. When no deforming impact force is operating, the gas spring 52 is fully extended, holding the steering mast supports 51 and 53 in their essentially vertical positions. These steering mast supports 51 and 53 hold steering mast 59 and steering wheel 60 in their normal positions relative to the amusement vehicle's operator. When an impact force operates, gas spring 52 is compressed with gas spring piston rod 52b forced into gas spring cylinder 52a. When gas spring 52 is compressed, the distance between pivot joints 67 and 66 is reduced. Simultaneously, this causes steering mast support 51 to rotate at its ends about pivot joints 55 and 57 and steering mast support 53 to rotate at its ends about pivot joints 56 and 58. The effect of this change in relative alignment of these members is to displace steering column mast 59 and steering wheel 60 forward, away from the vehicle operator's position. Upon the removal of the deforming impact force, the gas spring piston rod 52b is pushed out of the gas spring cylinder 52a, thereby restoring the gas spring 52 to its original configuration. This, in turn, reverses the relative movement of the steering assembly 50 members and results in the steering assembly being restored to its original configuration. The use of a push-pull cable 70 permits the end of the steering column assembly 50 to be moved back and forth without affecting the driver's ability to steer the vehicle.

Figure 8:
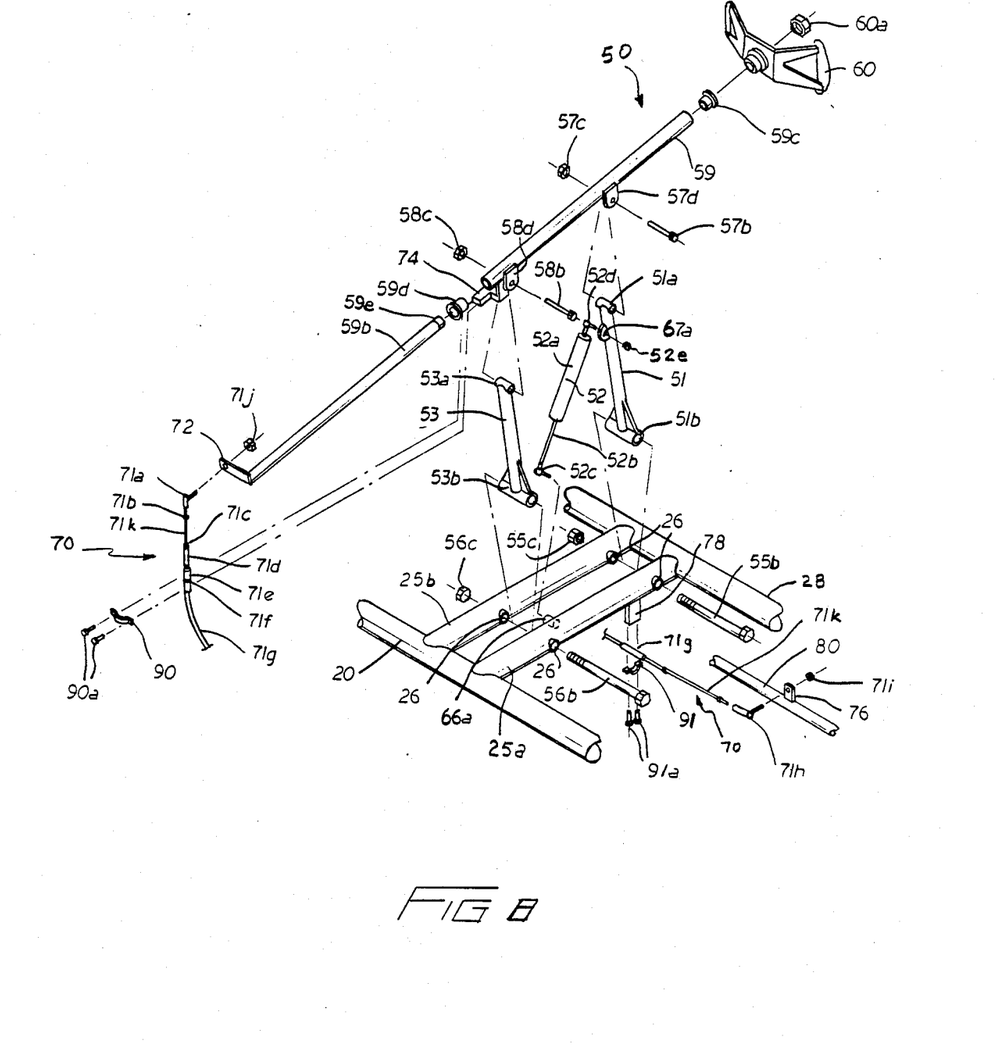
FIG. 8 is an exploded perspective view of the steering column assembly and flexible steering cable showing their component parts.

The exploded view depicted in FIG. 8 illustrates the details of the components of the steering column assembly 50 and flexible steering cable 70, in a preferred embodiment. The steering column assembly 50 is attached to portions of the vehicle frame 20. Two vehicle frame rails 25a and 25b extend rearwardly from the front of vehicle frame 20 to a vehicle frame cross-member 28. Such vehicle frame members form the support and platform for the steering column assembly 50. Two sets of sleeved holes 26 in vehicle rails 25a and 25b are provided. Steering mast supports 51 and 53 are pivotally attached to frame rails 25a and 25b at their lower pivot tubes 51b and 53b, respectively, by bolts 55b and 56b which pass through the sleeved holes 26 and pivot tubes 51b and 53b. Locknuts 55c and 56c secure bolts 55b and 56b, respectively. As assembled, this combination of bolts and pivot tubes form pivot joints 55 and 56, as shown in FIGS. 4-7 and 9-10.

The steering column is comprised of two major component pieces, a hollow tubular steering mast 59 and a steering shaft 59b which fits inside of the steering mast 59. Bushings 59c and 59d are provided which fit inside each end of the steering mast 59 and through which the steering shaft 59b passes. Bushings 59c and 59d provide bearing surfaces which permit the steering shaft 59b to move rotatably within the steering mast 59. Steering shaft 59b has threaded end 59e at its upper end. Steering wheel 60 is fitted over threaded end 59e. Locknut 60a secures steering wheel 60 to the steering shaft 59bb. At the other end of steering shaft 59b, opposite the steering wheel 60 end, steering arm 72 is attached to the steering shaft 59b. As assembled, the steering shaft 59b is rotatably mounted within the steering mast 59, with steering arm 72 attached to the end of the steering shaft 59b and the end of steering arm 72 following an arc centered at the longitudinal axis of steering shaft 59b.

Attached to the sides of the steering mast 59 are pivot ears 57d and 58d. These pivot ears are comprised of solid flat pieces, typically of metal, with holes in them, attached in pairs on both sides of the steering mast 9. Pivot ears 57d are attached along steering mast 59 near the end closer to the steering wheel 60. Pivot ears 58d are attached along the steering mast 59 near the end closer to the steering arm 72.

The steering mast 59 is attached to the steering mast supports 51 and 53 at pivot joints 57 and 58 respectively. The upper end of steering mast support 51 is pivot tube 51a. Similarly, the upper end of steering mast support 53 is pivot tube 53a. Pivot joint 57 (shown in FIGS. 4-7 and 9-10) is formed by securing steering mast support pivot tube 51a to steering mast 59 by passing bolt 57b through a hole in pivot ear 57d, then through the race of pivot tube 51a, then through the pivot ear 57d on the other side of the steering mast 59 and engaging locknut 57c to the threaded end at bolt 57b. Pivot joint 58 (shown in FIGS. 4-7 and 9-10) is formed in a similar fashion by attaching steering mast support 53 pivot tube 53a to pivot ears 58d using bolt 58b and locknut 58c.

Shock-absorbing damper element 52, a gas spring in a preferred embodiment, is mounted between steering mast 51 at pivot joint 67 and frame rail 25a at pivot joint 66 (shown in FIGS. 4, 6 and 7). The upper ball joint 52d threaded end of gas spring 52 is secured by a locknut 52e to the pivot ear 67a near the top of steering mast support 51. Gas spring 52 is fastened to frame rail 25a at threaded stud 66a by the threaded end of ball joint 52c at the lower end of gas spring 52, thereby forming pivot joint 66 (shown in FIGS. 4, 6 and 7).

The flexible steering cable 70 is attached at its upper end 71a to steering arm 72. End 71a is typically comprised of a threaded ball joint. Such threaded ball joint is attached through a hole in steering arm 72 and secured by locknut 71j; the lower end 71h of the flexible steering cable 70 is attached to steering tie rod 80 at tie rod mounting post 76. End 71h is also typically comprised of a threaded ball joint. Such threaded ball joint is attached through a hole in tie rod mounting post 76 and secured by locknut 71i; the jacket 71g of flexible steering cable 70 is held in place at two places. Near the upper end of steering cable 70, the jacket 71g is attached to steering mast 59. Such attachment is accomplished by a clamp 90 secured by screws 90a to a steering mast mounting bracket 74 which is attached to the steering mast 59 near the end of the steering mast 59 closer to steering arm 72. The jacket 71g near the lower end or steering cable 70 is attached to frame rail 25a at frame rail mounting bracket 78 by clamp 91 which is secured by screws 91a to frame rail mounting bracket 78.

The use of a typical push-pull cable is contemplated. The chief feature which is required of such a cable is a flexible internal metal cable which can be moved in a reciprocating fashion within an essentially stationary, flexibly outer jacket. An example of such a cable is the kind manufactured by Morse Controls and described in the catalog entitled "Morse Red Jaket Push-Pull Cables and Control Systems". FIG. 8 illustrates some of the features of such a push-pull cable. Ball joint 71a and nut 71b are fitted to the threaded end of rod 71k. Rod 71k is enclosed by rod sleeve 71d with rod seal 71c keeping dirt and moisture out of this overlay. Rod sleeve 71d is fitted into hub 71f with sleeve seal 71e keeping dirt and moisture out of the overlay. Outer jacket 71g is covered at its end by hub 71f. This configuration is typically employed for both ends of the push-pull cable in the instant invention. A swivel (not shown) is provided which permits the right rod 71k to be deflected about the longitudinal axis of the hub 71f without damaging the cable 70. This feature assists in the transfer of motion from the steering shaft 59b to the tie rod 80.

Figure 9:
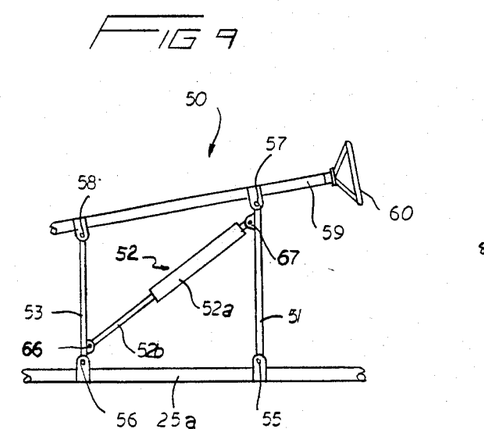
FIG. 9 is a side view of a second preferred embodiment of the steering column assembly only, in its undeformed state.
Figure 10:
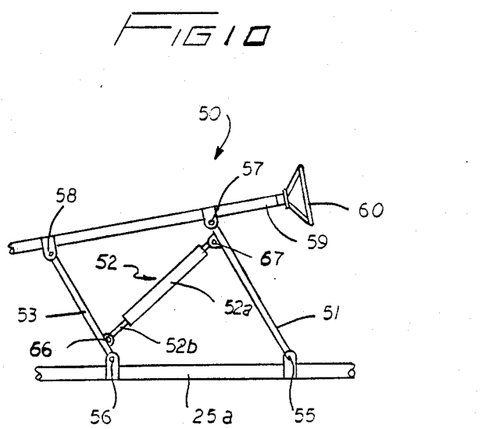
FIG. 10 is a side view of a second preferred embodiment of the steering column assembly only, in its deformed state.

FIGS. 9 and 10 illustrate an alternative embodiment of the steering assembly 50 with the gas spring 52 mounted diagonally between pivot point 67 on steering mast support 51 and pivot joint 66 on steering mast support 53. In this alternative embodiment, pivot ears are used to form the pivot joints 55 and 56 attached to the frame rails 25a and 25b, rather than sleeved holes 26. FIG. 9 illustrates the alternate embodiment of the steering assembly 50 in its undeformed state. FIG. 10 shows the alternate embodiment in its deformed state. Otherwise, the operation of the alternate embodiment is essentially the same as the preferred embodiment of FIGS. 4-8.

In the description above, the attachment of the steering arm 72 to the steering shaft 59b, the attachment of the steering mast mounting bracket 74 to the steering mast 59, the attachment of the pivot ears 57d and 58d to the steering mast 59, the attachment of the threaded stud 66a to the frame rail 25a, the attachment of frame rail mounting bracket 78 to frame rail 25a and the attachment of tie rod mounting post 76 to tie rod 80 are each contemplated to be made by welding in a preferred embodiment. Other means of attachment are contemplated, however. The various frame members are welded together in a preferred embodiment. The various rigid steering column assembly components are contemplated to be made of metal in a preferred embodiment.

In a preferred embodiment, tubular chromium-molybdenum steel aircraft alloy 4130, manufactured by K & P Manufacturing of Azusa, California is employed for the vehicle frame. The steering column assembly and tie rod, with the exception of the steering mast and steering mast supports, are made from grade 1018 cold-rolled steel. The steering mast supports and steering mast are made from drawn-over-mandrel tubing. Other metals and manufacturers are contemplated, however.

In a preferred embodiment, a push-pull cable is employed at the end of the steering column to convert the rotational motion of the steering wheel to linear motion of the tie rod. Other arrangements are contemplated which would allow the steering column to be moved back and forth, as in the case of impact, while still permitting the vehicle to be steered.

The above discussion and related illustrations of the present invention are directed primarily to preferred embodiments and practices of the invention. However, it is believed that numerous changes and modifications in the actual implementation of the concepts described herein will be apparent to those skilled in the art, and it is contemplated that such changes and modifications may be made without departing from the scope of the invention as defined by the following claims.

What is claimed is:

1. An amusement vehicle comprising:
    a. a vehicle frame;
    b. a body shell mounted on said vehicle frame; and
    c. a resilient bumper provided on said body shell to form an open-ended gap between said bumper and said body shell inboard of said frame;
wherein, upon application of an impact force to said bumper, said bumper deforms resiliently into said gap between said bumper and said portions of said body shell inboard of said vehicle frame.

2. An amusement vehicle as in claim 1 comprising a bumper and body shell which are formed as one-piece.

3. An amusement vehicle as in claim 1, wherein said bumper rotates about said vehicle frame as said bumper deforms resiliently upon impact.

4. An amusement vehicle as in claim 1, wherein said bumper is positioned around the circumference of said vehicle.

5. An amusement vehicle as in claim 1 further comprising a steering assembly mounted on said vehicle frame.

6. An amusement vehicle as in claim 5 further comprising an impact-absorbing steering column integrated into said steering assembly.

7. An amusement vehicle as in claim 6, wherein said impact-absorbing steering column includes a damper mounted between said steering column and said vehicle frame.

8. An amusement vehicle as in claim 6, wherein said steering assembly includes a push-pull cable attached to an end of said impact-absorbing steering column for transmitting motion to a tie rod.

9. An amusement vehicle body shell to be fitted onto a vehicle frame comprising:
    a. a cockpit; and
    b. a bumper provided on said cockpit; and
    c. an open-ended gap defined by a first wall and a second wall and formed between said bumper and said cockpit, wherein said cockpit is inboard of said first wall and said bumper is outboard of said second wall;
wherein said bumper deforms resiliently into said gap between said bumper and portions of said body shell inboard of said first wall.

10. An amusement vehicle body shell to be fitted onto a vehicle frame comprising:
    a cockpit and bumper formed as one-piece having an open-ended gap defined by a first wall and a second wall and formed between said bumper and said cockpit, wherein said cockpit is inboard of said first wall and said bumper is outboard of said second wall;
wherein said bumper deforms resiliently into said gap between said bumper and portions of said body shell inboard of said first wall.

11. An amusement vehicle bumper comprising:
    a body shell having a gap formed to fit upon a vehicle frame wherein said gap is formed between inboard portions of said body shell that are inboard of said frame and outboard portions of said body shell that are outboard of said frame; and a cavity formed in said outboard portions of said body shell, said cavity filled with a deformable, resilient material;

wherein said filled cavity absorbs shock by deforming and moving into said gap between said inboard portions of said body shell and said outboard portions of said body shell.

12. A bumper as in claim 11 comprising a filled cavity which rotates about said frame as it deforms and moves into said gap.

13. A bumper as in claim 11 comprising a filled cavity which wraps circumferentially around said body shell.

* * * * *

UNITED STATES PATENT AND TRADEMARK OFFICE
CERTIFICATE OF CORRECTION

PATENT NO. : 4,838,592

DATED : June 13, 1989

INVENTOR(S) : Sobodos, David W. et al.

It is certified that error appears in the above-identified patent and that said Letters Patent is hereby corrected as shown below:

In the Specification:

In column 1, line 18, after "powered" insert -- . --.

In column 4, line 49, "mat" should read -- mast --.

In column 4, line 61, "0" should read -- 80 --.

In column 6, line 8, "59bb" should read -- 59b --.

In column 7, line 5, "flexibly" should read -- flexible --.

In column 7, line 7, "Jaket" should read -- Jacket --.

In the Claims:

In claim 9, column 8, line 42, "and" should be omitted.

UNITED STATES PATENT AND TRADEMARK OFFICE
CERTIFICATE OF CORRECTION

PATENT NO. : 4,838,592

DATED : June 13, 1989

INVENTOR(S) : Sobodos, David W. et al.

It is certified that error appears in the above-identified patent and that said Letters Patent is hereby corrected as shown below:

In claim 11, column 9, lines 1-8 should be single spaced.

Signed and Sealed this

Fifth Day of June, 1990

Attest:

HARRY F. MANBECK, JR.

Attesting Officer

Commissioner of Patents and Trademarks